Nov. 28, 1939.  O. H. OTTERSON  2,181,199
OXYGENATED CABIN
Filed March 28, 1936  4 Sheets-Sheet 2

INVENTOR:
OTTO HAROLD OTTERSON,

ATTORNEY

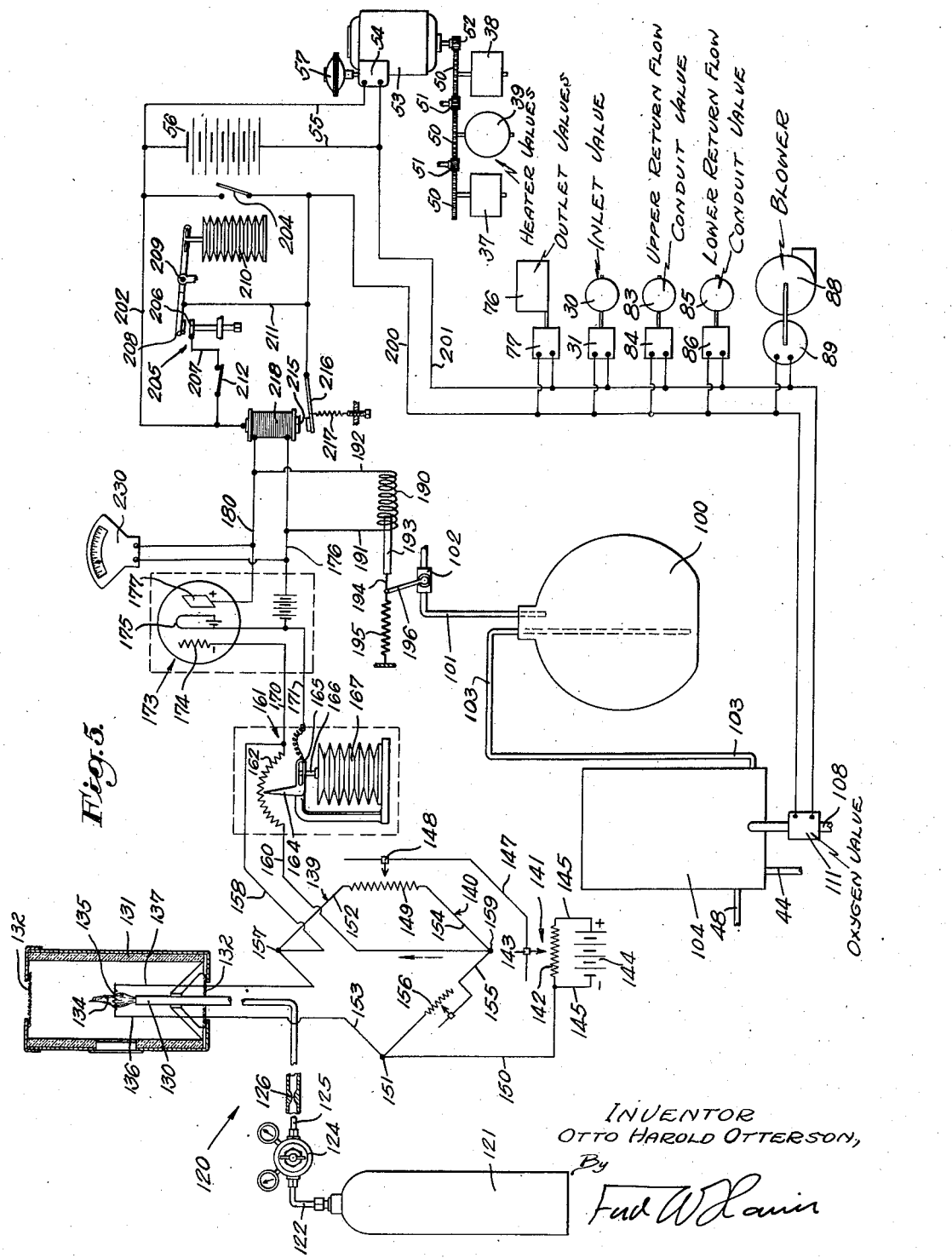

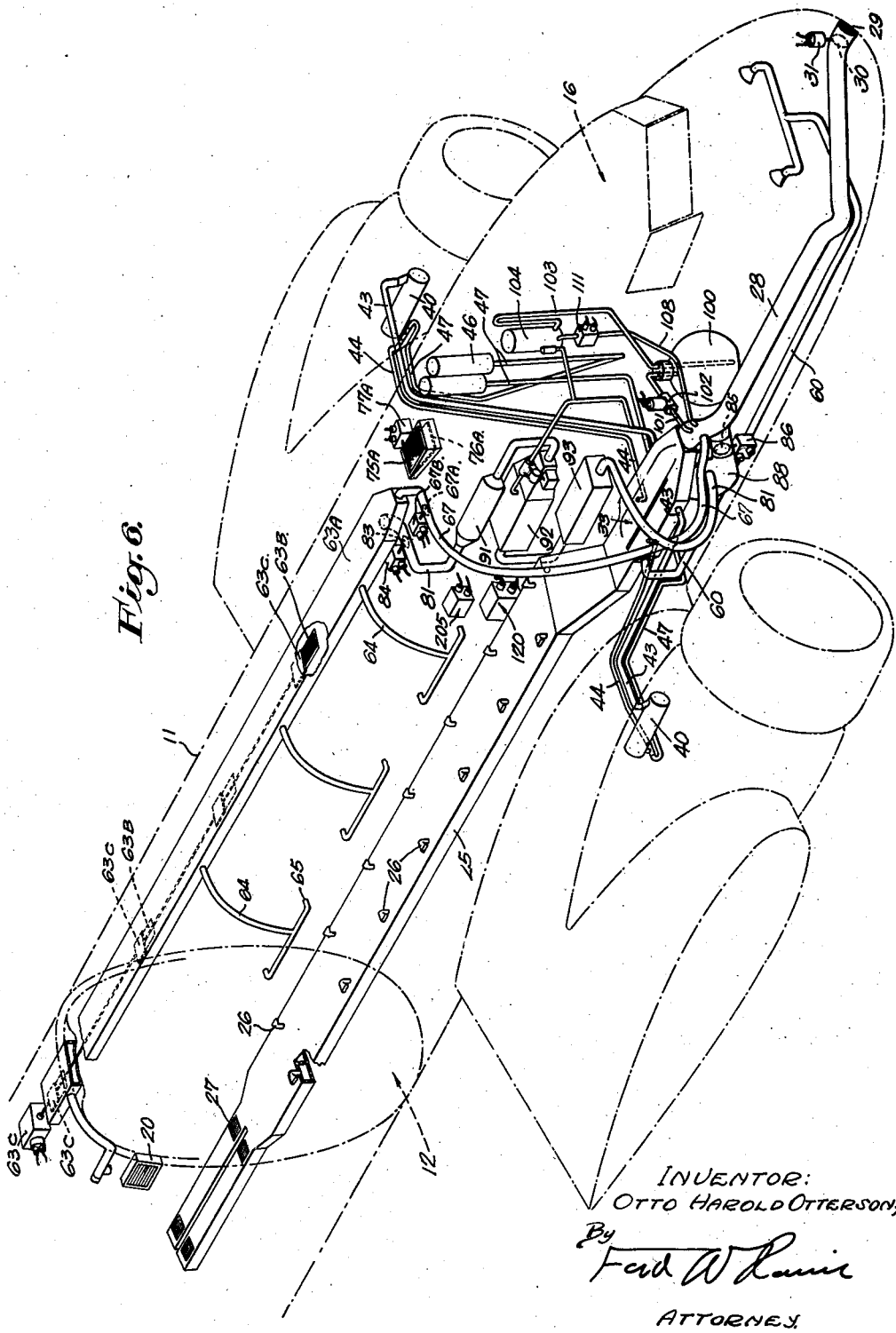

Patented Nov. 28, 1939

2,181,199

UNITED STATES PATENT OFFICE 2,181,199

OXYGENATED CABIN

Otto Harold Otterson, Los Angeles, Calif., assignor to Douglas Aircraft Company, Inc., Santa Monica, Calif., a corporation of Delaware Application March 28, 1936, Serial No. 71,431

13 Claims. (Cl. 128—204)

My invention relates to airplanes or other aerial vehicles, and more particularly resides in an aerial vehicle having a special type of air supplying system whereby air or atmosphere having adequate oxygen concentration at all elevations from ground level to maximum intended flying elevations is supplied to the cabin of the airplane in order that all occupants or passengers may have a breathing atmosphere which supports convenient respiration. My invention further relates to a method of supplying to occupants of an aerial vehicle air which will support normal or comfortable respiration.

In the preferred form of my invention to be described and disclosed herein I provide a complete system or apparatus and method for accomplishing all of the objects, features, and advantages to be set forth hereinafter. However, while the preferred form of my invention includes the combination of instrumentalities and steps in its entirety, I wish it to be understood that I consider the invention not only to be novel in its entirety, but, so far as I am advised, to be novel in its various subcombinations, steps, and elements which comprise the whole. It is possible to independently employ certain subcombinations of the preferred form of my invention or part of the entire method and certain individual elements devices or steps thereof; and I therefore desire to make it clear that I claim as my invention not only the combination and method as a whole, but the various subcombinations, elements, and steps which comprise the whole, and which are covered by the claims appended hereto.

In order that the features and advantages of my invention may be better understood, I will refer in general to the flying art to which my invention relates.

There are certain recognized advantages obtained from flying airplanes or other aerial vehicles at elevations of 20,000 to 25,000 feet above sea level. For example, at this height most of the unusual bad weather encountered at lower elevations may be avoided. Passenger comfort is greatly improved due to the fact that "bumpy air" is very rare at such altitudes; likewise, the noise level is noticeably decreased. Furthermore, there are increases in flying speed and flying efficiency which are quite important. All of these factors make it highly desirable to be able to fly at such elevations. However, due to insufficient oxygen concentration in the atmosphere it has in the past been impossible to fly at such elevations in commercial work and has been attempted only on rare occasions where pilots have attempted to make speed or economy records.

It is an object of my invention to provide an aerial vehicle which is adapted for flying in commercial use at relatively high elevations.

The principal factor which has prevented commercial flights at high elevation is that at elevations of 12,000 feet or higher the oxygen concentration in the atmosphere is inadequate to satisfy normal breathing requirements. The respiration of the human body is essentially a constant volume process; that is, the lungs inhale a constant volume of the atmosphere, extract from that volume of atmosphere the amount of oxygen required by the body, and exhale the unused atmosphere and the products of combustion. The volume of atmosphere inhaled in a normal respiration is very nearly a constant, not varying, therefore, with changes in pressure due to altitude. Since the lungs inhale a constant volume of atmosphere, it is necessary, in order to maintain ordinary life or to permit comfortable normal respiration, that at any pressure the number of molecules of oxygen in each unit volume of atmosphere be held above a definite lower limit. In other words, it has been found in airplane flights that up to a certain limit any discomfort felt by passengers at high altitude is due almost entirely to a decrease in oxygen concentration. Up to a certain altitude, the decrease in pressure has but little, if any, effect on the passengers. The terms "concentration" or "concentration of oxygen" to be employed herein will have reference to the number of molecules of oxygen per unit volume of atmosphere, and when it is stated that the oxygen concentration is inadequate, it is meant that the number of oxygen molecules per unit volume is below a definite lower limit.

As a further explanation of atmospheric conditions at high elevations, at an elevation of 18,000 feet above sea level with the temperature of the cabin of the aerial vehicle held constant at normal room temperature, the pressure and density of the air in the cabin will have one-half of their sea-level value. The percentage of oxygen with respect to other gases contained in the cabin atmosphere will remain the same as it was at sea level. Therefore, each cubic foot of atmosphere at this altitude will contain one-half the number of molecules of air that it contained at sea level, and, since the percentage of oxygen is the same, the atmosphere will contain but one-half the number of molecules of oxygen which it contained at sea level. In order to maintain a concentration of oxygen equivalent to that at sea level it is necessary to increase the percentage of oxygen in the air at this altitude from 21% as it was at sea level to 41.6% by volume. In this way each cubic foot of the cabin atmosphere at 18,000 feet altitude will contain the same number of molecules of oxygen as it did at normal sea level percentage and pressure. Of course, by such addition of oxygen the additional molecules will force out an equivalent number of molecules of the other gases comprising the air, notably nitrogen, so that the concentration of the inert gases in the cabin is considerably decreased. It has been found, however, that in airplane flight it is not necessary to maintain the oxygen concentration at its sea level value, and in experiments it has been determined that oxygen concentration maintained at the equivalent of oxygen concentration at approximately 10,000 feet above sea level is fully adequate for breathing purposes and, so far as practical use is concerned, is no different from atmosphere having sea-level oxygen concentration values. Therefore, in this specification the term "adequate oxygen concentration" or its equivalent is not to be construed to mean sea-level concentration, but any concentration of atmosphere which is at or above the limit of concentration which will comfortably support normal respiration.

It is an object of my invention to provide an aerial vehicle in which the atmosphere therein is maintained at a sufficient oxygen concentration to support comfortable respiration.

It is a further object of my invention to provide an aerial vehicle in which the atmosphere in the cabin, at such elevations where the oxygen concentration of the surrounding atmosphere is inadequate to support normal respiration, is artificially supplied with enough oxygen to give the atmosphere the desired oxygen concentration.

It is an object of my invention to provide an aerial vehicle in which the atmosphere may be circulated through the cabin of the aerial vehicle for use by the occupants and which may be operated in order to close the circulation of atmosphere from the outside to the inside of the aerial vehicle and at that time to set up a closed circulation of atmosphere within the aerial vehicle in which oxygen as required may be added.

It is an object of my invention to provide an aerial vehicle having an atmosphere circulating system which may be kept open; that is, in communication with the outside atmosphere so that the outside atmosphere may be circulated through the cabin, or which may be closed so that there will be no circulation of atmosphere from the outside and in which the atmosphere within the aerial vehicle is replenished with oxygen as required.

It is a further object of my invention to provide an aerial vehicle having a system of the character referred to in which the changeover from the outside circulation to the closed circulation may be controlled automatically, as when the oxygen concentration within the cabin becomes inadequate or when the pressure decreases, thus indicating an elevation at which an artificial supplying of oxygen is required; or may be manually controlled so that even at low elevations the oxygen concentration may, if desired, be maintained at, near, or even above normal sea-level concentration in order that emergency conditions may be met.

It is an object of my invention to provide an aerial vehicle in which atmosphere is circulated through the cabin of the vehicle and is withdrawn therefrom and replenished with the necessary amount of oxygen before it is reintroduced into the cabin.

It is a further object of my invention to provide an aerial vehicle having an atmosphere or air circulating system, as pointed out heretofore, in which oxygen is continuously supplied to the atmosphere in amounts corresponding to the deficiency of oxygen in the atmosphere. In other words, when the oxygen deficiency is quite small, the volume of oxygen added will be quite small. However, where the oxygen concentration becomes quite rare, the oxygen supplied to the atmosphere will be supplied in relatively large amounts for the purpose of as quickly as possible bringing the atmosphere back to normal or back to the desired concentration.

It is another object of my invention to provide an aerial vehicle having a system, as pointed out heretofore, in which the oxygen is supplied as needed from a source of liquid oxygen which is delivered to a vaporizer and is delivered from the vaporizer into the flow of atmosphere.

A still further object of my invention is to control the supplying of liquid oxygen into the vaporizer by closing a vent valve in the liquid oxygen container which builds up a pressure and forces liquid oxygen into the vaporizer in accordance with the pressure built up. In the preferred form of my invention the vent valve is operated by a control means, which control means is in turn operated in accordance with the oxygen concentration in the cabin of the aerial vehicle, and the parts are so arranged that the vent valve is closed in amounts corresponding to the oxygen deficiency of the atmosphere in the cabin so that when the oxygen deficiency is great the vent valve will be closed a relatively large amount so that a greater pressure will be developed in the liquid oxygen container, thus forcing a larger amount of liquid oxygen into the vaporizer.

It has been proposed by prior inventors in the prior art to construct airplanes or other aerial vehicles with the cabin sealed so that sea-level atmospheric conditions and pressures may be maintained. This, however, involves costly construction since it is necessary to quite fully reinforce the cabin of the airplane to take care of the differences in pressure, the cost of which amounts to considerable in view of the size of aerial vehicles which are used at the present time. I have found that it is unnecessary for passenger comfort to maintain sea-level pressures when flying at or below 25,000 feet elevation.

It is accordingly an object of my invention to provide an aerial vehicle having an atmosphere conditioning apparatus or means, as pointed out heretofore, in which the pressure within the cabin is equal to the pressure of the surrounding atmosphere.

It is a further object of my invention to provide a special type of pressure equalizing means or equalizing valve which is effective in preventing the circulation of air from the exterior to the interior of the cabin, but which at the same time functions to very quickly equalize internal and external pressures such as may be necessary when an airplane rapidly climbs or descends.

It is a further object of my invention to provide an aerial vehicle having an atmosphere conditioning system which when it is closed is adjustable so that a slight excess of pressure may be maintained within the cabin so as to insure that the pressure within the cabin will be at least equal to external pressures. This is desirable in order to be certain that at all times there will be no compressing forces on the fuselage of the aerial vehicle and, furthermore, to assist in replacing carbon dioxide gas which is exhaled by the passengers.

It is also an object of my invention to provide in the air circulating system previously referred to various means for conditioning the air, such as an ozone device or a smoke and germ eliminator, a humidity and temperature control, as well as a carbon dioxide eliminator. These are desirable in view of the fact that when the air circulating system is closed the atmosphere is re-used.

As pointed out heretofore, my invention not only resides in a novel combination of elements, subcombinations, and elements themselves, but also resides in certain methods whereby air suitable for normal respiration is supplied to occupants of an aerial vehicle. It is accordingly an object of my invention to provide a method of this character in which air is withdrawn from the exterior of the aerial vehicle and circulated through the cabin thereof until such times that the atmosphere has an inadequate oxygen concentration, and at which time the supplying of air from the exterior is discontinued and closed circulation set up within the aerial vehicle and oxygen artificially supplied thereto.

It is a further object of my invention to provide a method of the character pointed out heretofore to utilize the exterior air at all times during the flight except at such times that this exterior air does not have adequate oxygen concentration to support normal or comfortable respiration, and at that time recirculated air is delivered to the cabin in which the occupants are located, which recirculated air is being supplied with required amounts of oxygen to maintain the desired oxygen concentration.

It is a still further object of my invention to provide a method of flying an airplane which includes a system incorporating the features of my invention in which in descent the pressure within the cabin of the aerial vehicle is increased at such a rate of speed that the oxygen concentration thereof is maintained without requiring the artificial adding of oxygen.

It is a still further object of my invention to provide a method of the character pointed out in the preceding paragraph which involves the step of causing the airplane to descend at such a rate of speed that the oxygen concentration will be maintained as desired without the necessity of artificially adding oxygen to the air.

In the foregoing statement of invention and objects I have pointed out the important and general objects of my invention. There are in addition numerous features and advantages which reside in the various combinations of parts and elements which I have designed for the purpose of carrying out my invention, and these additional objects and advantages will be referred to at appropriate times during the following description of the preferred form of my invention.

Referring to the accompanying drawings in which I have schematically illustrated the preferred embodiment of my invention, Fig. 1 is a schematic perspective view showing an aerial vehicle in the form of a low wing type airplane. In this view the fuselage and wing portions are indicated in broken lines.

Fig. 5 is a diagrammatic view showing the control system of my invention whereby various valves, blower, etc., are operated.

Fig. 6 is a view like Fig. 1, showing an alternative form of conduit means of my invention.

Figure 1:
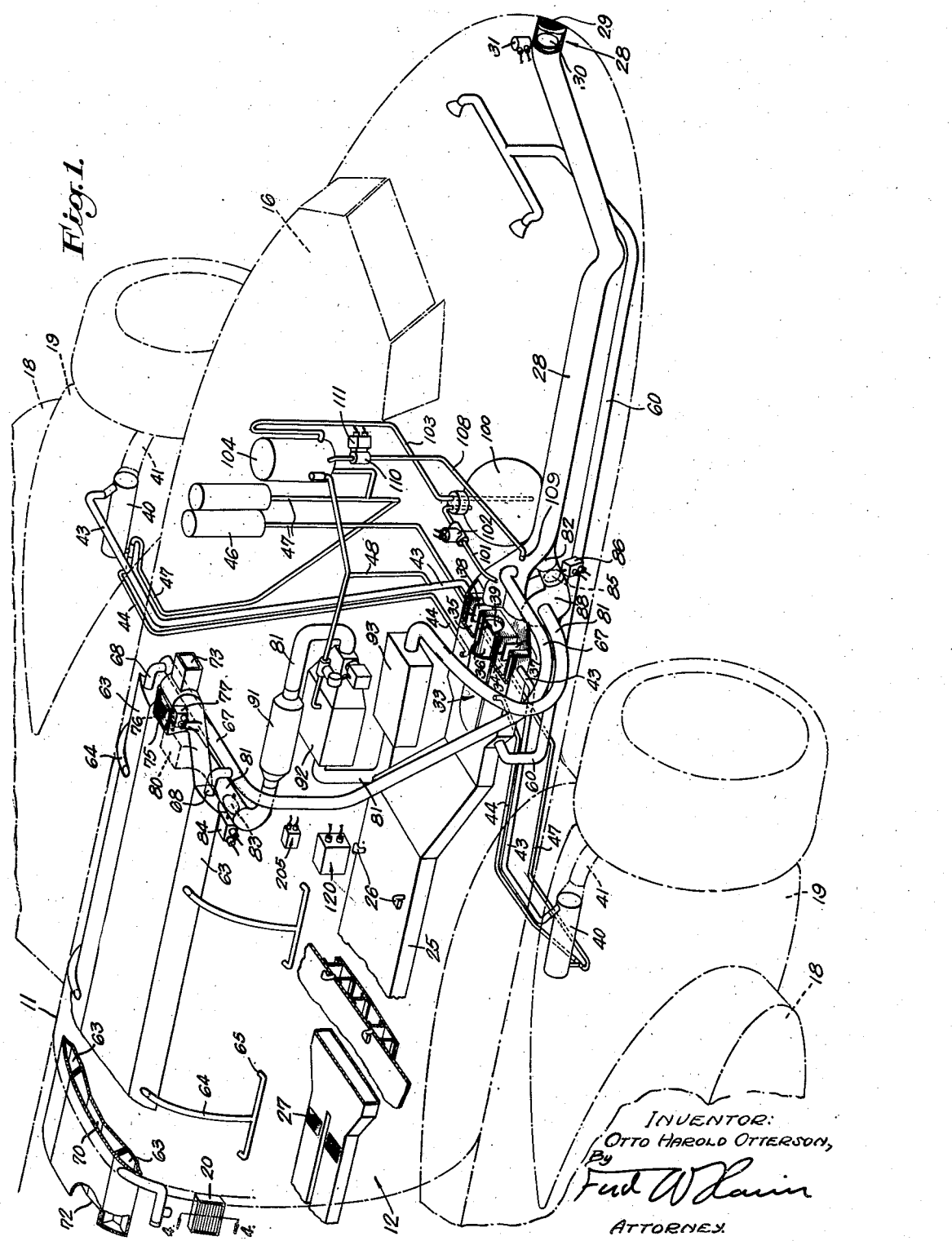

Referring particularly to Fig. 1, the aerial vehicle, as previously pointed out, is illustrated in phantom by broken lines in order that the features and construction of the circulating system of my invention may be better illustrated. The numeral 11 represents the fuselage or ship of the airplane, which fuselage provides a cabin 12 which constitutes the enclosure wherein the passengers are located and may constitute any enclosed space in the airplane. The term "ship" is used broadly to designate the cabin or compartment providing structure of any aerial vehicle. As shown best in Fig. 2, the cabin 12 is provided with a floor 14 which supports chairs or berth constructions 15 for the passengers. At the forward part or nose of the fuselage is the pilot's compartment which will be designated by the numeral 16. Extending outwardly from the fuselage are wings 18, the outer parts of which are broken away, which support nacelles 19 carrying the motors (not shown).

Figure 4:
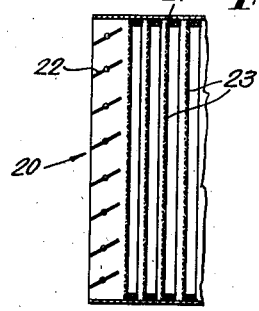
Fig. 4 is a sectional view taken on the line 4—4 of Fig. 1 and illustrating the internal construction of the pressure equalizer of my invention.

My present invention is intended for use where the pressure within the airplane is the same as the surrounding atmospheric pressure. It should be understood, however, that although I believe such a design to be preferable in the embodiment herein shown and described, the invention is not so limited but could readily be applied to airplanes in which sea-level or other predetermined pressure is maintained at all times within the cabin. In the preferred form of my invention the pressures are equalized by a pressure equalizer 20 shown in Fig. 1 as being applied to the wall of the fuselage 11. As illustrated in Fig. 4, the pressure equalizer includes a shell 21 having adjustable shutters 22 at the inner part thereof and is provided with a series of cheesecloth discs 23. These discs 23 permit rapid balance of pressure but at the same time prevent any material inflow or outflow of atmosphere therethrough. The pressure equalizer 20 shown merely represents one form of different types of pressure equalizers which might be employed, and I therefore do not wish to be limited thereto.

Referring again to Figs. 1 and 2, my invention provides an air circulating means or system which will now be described. In the cabin 12 is a warm air supply conduit 25 which is conveniently located in a central longitudinal position below the floor 14. It is provided with upwardly projecting nozzles 26 and also with registers 27, as desired, for delivering warm air to the cabin 12. The numeral 28 represents an external air inlet. The external air inlet has a mouth 29 communicating with the exterior of the fuselage 11 at the forward end thereof where air may be forced by pressure into the air inlet. This air inlet 28 extends from the nose of the airplane rearwardly through the pilot's compartment 16 and is connected to the forward end of the warm air supply conduit. For the purpose of controlling the passage of air through the air inlet 28 there is provided at the mouth 29 an inlet closing means in the form of an inlet valve 30 which is operated by a suitable operating means, such as the solenoid device 31. This solenoid device 31 is not illustrated in detail, since such devices are well known in the industry, and therefore details are not required.

For the purpose of controlling the temperature of the air or atmosphere which flows through the warm air supply conduit 25 I provide in the forward part of the warm air supply conduit a heater which I designate by the numeral 33. This heater 33 includes three passages, two outside passages 34 and 35, and a central passage 36. These three passages 34 to 36 inclusive are provided with dampers 37, 38, and 39, respectively, for controlling the flow of air through these three passages. The two passages 34 and 35 are steam heated so that the air flowing therethrough is heated while the central passage is unheated and the air passing therethrough remains cool. By passing a part of the air through the heated passages and another part through the cool passage it is possible to obtain air which has the desired temperature.

For the purpose of heating the passages 34 and 35 my invention makes use of boilers 40 which are connected to the exhaust passages 41 of the motors of the airplane in accordance with standard practice. Steam flows from the boilers 40 through steam pipes 43 which, as shown, are connected to the spaces surrounding the passages 34 and 35. Condensates are returned to the boilers through condensate pipes 44, and additional water is supplied to the boilers from water tanks 46 which are connected to the boilers by water supply pipes 47. Connected to the steam pipes 43 are various branch pipes 48 which may extend to the different apparatus in the airplane which require steam in their operation. The dampers 37 to 39, inclusive, are thermostatically operated by a means diagrammatically illustrated at the right end of Fig. 5. The dampers, as shown, are connected to gears 50 and intermeshing gears 51, which gears are operated by a pinion gear 52, in turn operated by a motor 53. The motor 53 is suitably energized by a switch 54, which switch 54 is connected by wires 55 to a source of energy 56. Associated with the switch 54 is a thermostatic device 57 which controls the operation of the switch, which in turn controls the energization of the motor 53, which in turn operates the dampers 37, 38, and 39. The thermostatic device, switch, and motor are well known in the industry and therefore need not be described.

Connected to the warm air supply conduit at the exhaust side of the heater 33 is a pilot's compartment supply conduit 60 which supplies the pilot's compartment 16 with air.

Since some of the passengers may desire cool air, my invention provides a pair of cool air supply conduits 63 which extend longitudinally of the cabin and which are mounted in the ceiling at opposite sides of the longitudinal center plane. Connected to the cool supply conduits 63 and extending downwardly therefrom are branch pipes 64 having valved nozzles 65 which may be opened or closed by the passengers. The forward ends of the cool air supply conduits are connected to the air inlet 28 immediately ahead of the heater 33 by means of a connecting conduit 67. This connecting conduit as shown is connected to the air inlet 28 immediately ahead of the heater 33 and is connected to the forward ends of the cool air supply conduits 63 by branch conduits 68.

The warm air supply conduit 25, the air inlet 28, the pilot's compartment supply conduit 60, the cool air supply conduits 63, and the connecting conduit 67, are designated in general as an "air supply means", since it is through these parts that air or atmosphere is supplied to the cabin 12.

Figure 2:
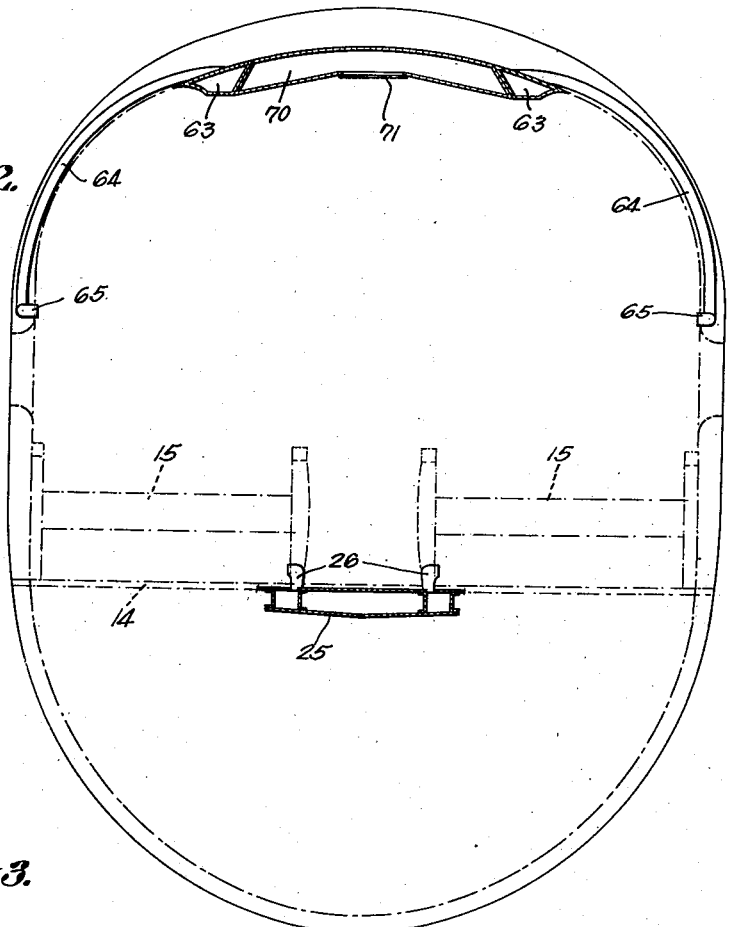
Fig. 2 is a cross-sectional view taken through the fuselage of the airplane.

Mounted in the ceiling of the cabin 12 and in a position between the cool air supply conduits 63 is an exhaust conduit 70. This exhaust conduit 70, as shown in Figs. 1 and 2, extends longitudinally of the cabin 12 and is provided with suitable registers 71, and may also be left open at its rearward end as indicated at 72 in Fig. 1. Atmosphere may be exhausted from the pilot's compartment 16 by the pilot's compartment exhaust conduit 73 which, as shown in Fig. 1, is connected to the forward end of the exhaust conduit 70. These parts constitute an "air exhaust means" of my invention. The exhaust conduit 70 is provided with an outlet opening 75 which communicates through the top of the fuselage with the exterior of the plane. This outlet opening is provided with an "outlet closing means" in the form of an outlet valve 76 which is operable to open or close the outlet opening 75. This outlet valve is operated by a solenoid device 77, as will be described later.

The two valves 30 and 76 constitute a "closing means" of my invention whereby the system is closed from the exterior, as will be fully described later.

In the apparatus thus far described, and with the inlet and outlet valves 28 and 75 open, the circulation of air through the cabin 12 and pilot's compartment 16 is as follows. Due to the velocity of the airplane, air will enter the mouth 29 of the air inlet 28 under pressure and will flow rearwardly therethrough and into the forward end of the warm air supply conduit 25. This air which is at a temperature of the external atmosphere passes through the heater 33, a part going through the warm air passages 34 and 35, and another part going into the cool air passage 36 in proportions depending upon the positions of the shutters 37 to 39 inclusive, which are operated by the mechanism shown at the right end of Fig. 5, as previously described. The air being suitably heated passes rearwardly through the warm air supply conduit 25 and is introduced into the cabin 12 through the supply nozzles 26. Warm air also flows through the pilot's compartment supply passage 60, and in this way warm air is supplied to both the cabin 12 and the pilot's compartment 16. A portion of the cool air flows through the connecting conduit 67 and into the cool air supply conduits 63 so that the passengers may receive cool air, as desired, by operating the valved nozzles 65.

The air flows from the cabin 12, through the exhaust conduit 70, passing out through the outlet opening 75. The air also passes from the pilot's compartment 16, through the pilot's compartment exhaust conduit 73, and through the outlet opening 75 to the exterior. This circulation is maintained due to the pressure of the air in the air inlet 28, which pressure is developed, as previously pointed out, due to the velocity of the airplane.

When a certain altitude has been reached in flight or when the oxygen concentration of the air in the cabin 12 drops to a certain predetermined minimum, the system will automatically close through the operation of a "changeover means" of my invention, and a closed circulation of air is set up through and by additional apparatus which will now be described.

Connected to the forward end of the exhaust conduit 70 at a point indicated at 80 is a return flow conduit 81. The other end of the return flow conduit 81 is connected to the air inlet 28 at a point 82 which is ahead of the heater 33 and ahead of the point at which the connecting conduit 67 is connected to the inlet conduit 28. At a point adjacent the point 80 where the return flow conduit is connected to the exhaust conduit 70 there is an upper return flow conduit valve 83 which is closed when the return flow conduit 81 is not in use. This valve 83 is operated by a solenoid device 84. At a point adjacent to that at which the return flow conduit 81 connects to the air inlet 28 is a lower return flow conduit valve 85 which is operable by a solenoid device 86. The valves 83 and 85 function as a "return flow conduit closing means" and are closed except when the air in the cabin 12 is recirculated through the cabin. Located in the return flow conduit 81 is a blower 88 which is operated by a motor 89 diagrammatically illustrated in the lower part of Fig. 5, which motor 89 is energized when the valves 83 and 85 are opened.

The return flow conduit 81, valves 83 and 85, and the blower 88, collectively form an "air recirculating means" of my invention.

When the system is closed and air is recirculated through the cabin 12 and compartment 16, the inlet valve 30 and the outlet valve 76 are closed. The return flow conduit valves 83 and 85 are opened and the motor 89 of the blower 88 is energized. The motor produces a suction on the return flow conduit 81 which draws the air from the forward end of the exhaust conduit 70, this air flowing through the flow return conduit 81 instead of flowing to the exterior of the airplane through the outlet opening 75. The blower delivers the air into the rearward part of the air inlet 28 and this air flows through the heater 33 and the warm air supply conduit 25 into the cabin 12. A portion of this warm air also flows through the pilot's compartment supply passage 60. Another portion of the air is delivered through the connecting conduit 67 to the cold air supply conduit 63 and thence through the pipes and valved nozzles 65 into the cabin 12. The air in the cabin 12 is then withdrawn into the exhaust conduit 70 and recirculated through the return flow conduit 81, as previously described. The air is likewise withdrawn from the pilot's compartment 16 through the pilot's compartment exhaust conduit 73.

Since the air at this time is continuously recirculated through the cabin 12 and pilot's compartment 16, it is necessary to recondition and purify the air. This is most conveniently done by apparatus which is located in the return flow conduit 81 between the return flow conduit valves 83 and 85, in which position it is in use only when the air is recirculated. When the valves 83 and 85 are closed this apparatus is not in use, and furthermore it is not necessary since no conditioning or reconditioning of the air introduced through the air inlet 28 is necessary.

The conditioning apparatus which I employ is in the form of any standard apparatus in use at the present time and may consist of a smoke and germ eliminator and ozone device 91, humidity controller 92, and a carbon dioxide absorption device 93. Since these devices are well known both in construction and operation, their details will not be described.

Whenever the return flow or recirculating system is in operation the oxygen content of the air will be used by the passengers, and it is therefore necessary to replace this used oxygen and at the same time to compensate for any deficiency in oxygen in the atmosphere due to reduction of pressure. My invention therefore provides an oxygen supply means which includes a liquid oxygen flask 100 which contains the liquid oxygen. Since the liquid oxygen continues to boil and to change from a liquid into a gas, it is necessary to have a vent 101 which may be vented to the atmosphere or, for convenience, may be connected to the air inlet 28 so that the oxygen which passes from the flask 100 through the vent 101 may go into the circulating air and be used. Located in the vent 101 is a valve 102 which is operable, as will be described shortly, to close the vent 101, thus developing a pressure in the flask 100. The vent 101 and valve 102 comprise a "pressure applying means" of my invention.

Figure 3:
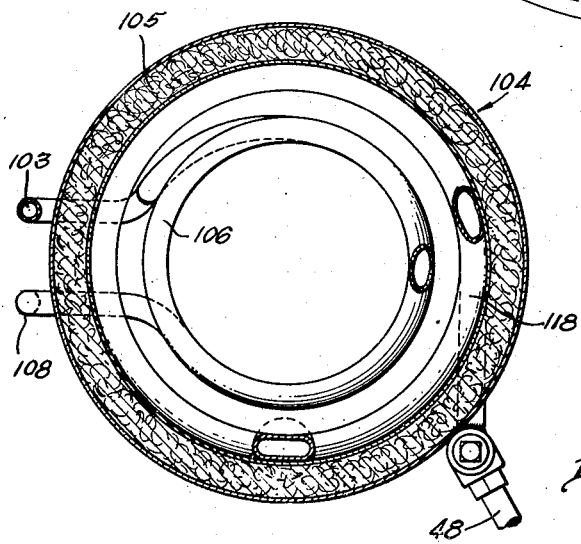
Fig. 3 is a horizontal sectional view taken through the oxygen vaporizer of my invention, showing the internal construction thereof.

Also connected to the flask 100 is a supply pipe 103, the inner end of which extends to a point near the bottom of the flask so that substantially all of the liquid oxygen may be forced therethrough. This supply line 103 is connected to an oxygen vaporizer 104, the construction of which is illustrated in the sectional view, Fig. 3. Referring to Fig. 3, the vaporizer 104 includes an insulated shell 105 which encloses an oxygen coil 106, to which the oxygen supply pipe 103 is connected. The outlet end of this coil 106 is connected by an oxygen pipe 108 to the air inlet 28 at a point 109 which is ahead of the heater 33 and the connecting conduit 67 but in back of the point at which the return flow conduit 81 is connected to the air inlet 28, so that when the recirculation system is in use the oxygen is introduced into the stream of air flowing from the return flow conduit 81 and is mixed with the stream of air before it flows into the heater 33 or the connecting conduit 67. This oxygen pipe 108 if desired may include a valve 110 which is operated by a solenoid 111, the valve 110 being opened only when oxygen is being supplied to the air inlet 28. Also enclosed in the insulation shell 105 is a steam coil 118 which supplies the heat necessary to vaporize the liquid oxygen. The inlet end of the steam coil is connected to one of the steam branch pipes 48 and the exhaust end is connected to one of the condensate return pipes 44 or one of the water supply pipes 47, by means of which steam condensates are returned to either of the boilers 40.

When the return flow apparatus is set into operation and is operated as previously explained, the valve 110 is opened and the valve 102 in the oxygen vent pipe 101 is closed an amount depending upon the deficiency of oxygen in the cabin 12, which operation will be fully described when the complete operating meechanism is referred to. However, the closing or partial closing of the valve 102 in the vent pipe 101 causes oxygen to accumulate in the upper part of the flask, thus producing a pressure which causes liquid oxygen to flow through the liquid oxygen pipe 103 to the vaporizer. In the vaporizer the liquid oxygen is vaporized and then flows through the oxygen pipe 108 into the air inlet 28 as described.

I will now describe the control means or control apparatus whereby the apparatus previously described may be manually or automatically controlled.

A part of the control apparatus consists of an oxygen indicator or oxygen concentration sensitive means which is preferably placed in the cabin 12 as shown at 120. A device which I find to be highly satisfactory for this purpose is described and disclosed in the application of Franklin Rudolf Collbohm, entitled "Method of and apparatus for maintaining oxygen concentration in a gaseous medium", Serial No. 56,501, filed December 28, 1935, and such type of apparatus has been diagrammatically shown in Figure 5. My invention is not limited to this particular oxygen concentration sensitive means, and others, which may be less satisfactory, may be used in lieu thereof.

In Fig. 5 the numeral 121 represents a source of fuel or fuel supply, such as hydrogen. This fuel supply is connected by means of a conduit 122 to a pressure regulating means 124 which reduces pressure of the hydrogen to a usable pressure and at the same time will deliver a constant weight of fuel at all times. Connected to the pressure adjusting means 124 by means of a pipe 125 having a jet 126 is a burner 130 which is suitably enclosed in a chimney 131 having screens 132 at its opposite ends which permit the atmosphere in the cabin 12 to pass into the chimney 131. Hydrogen being supplied to the burner 130 and ignited, will form a flame 134. As fully explained in the Collbohm application referred to heretofore, the size of the flame 134 depends upon the oxygen concentration in the atmosphere in which the flame burns, and the temperature per unit volume within the flame varies inversely to the size of the flame. In this type of indicating apparatus the temperature per unit volume within the flame 134 is employed to indicate the oxygen concentration in the atmosphere and to control the amount of current flowing in what I term a "control circuit" to be referred to later.

For determining the temperature per unit volume within the flame 134 there is a filament 135 which is a temperature responsive resistance element and is preferably in the form of a fine platinum wire. This filament 135 is connected at its ends to supporting wires 136 and 137 which not only serve to support the filament, but also serve as a part of the electrical circuit employed in the device. In the circuit in which the filament 135 is connected there is employed a Wheatstone bridge arrangement having an upper side 139 and a lower side 140. There is also provided a potentiometer 141 having a resistance 142 and movable contact 143 and an energizing battery, or other source of energy, 144 connected to the resistance by wires 145. The adjustable contact 143 is connected by a wire 147 to an adjustable contact 148 which is adapted to have electrical engagement with a resistance 149. A part of this resistance 149 forms a part of the side 139, and the other part forms a part of the side 140. That portion of the resistance on the left side of the battery 144 is connected by a wire 150 to the two sides 139 and 140 where they meet at a point 151. The sides 139 and 140 are divided into sections or legs 152, 153, 154, and 155. The resistance 149 is so divided by the adjustable contact 148 that a part thereof forms a resistance in the legs 152 and 154. The wires 136 and 137 which are connected to the filament 135 are connected in series in the leg 153, and therefore the filament 135 constitutes a variable resistance in the leg 153. In the leg 155 there is provided a rheostat 156 which may be used to balance the resistance of the filament 135.

Connected to the side 139 between the legs 152 and 153 at a point 157 is a wire 158, and connected to the side 140 at a point 159 is a wire 160. The wires 158 and 160 are connected to a density compensator 161 which includes a resistance 162, to the opposite ends of which the wires 158 and 160 are connected. Cooperating with the resistance 162 is a movable contact 164 which is connected by means of arms 165 and 166 to an evacuated bellows 167 which is employed to change the position of the movable contact 164 in accordance with atmospheric pressure in a manner pointed out in the Collbohm application. Connected to the wire 158 adjacent the resistance 162 is a wire 170, and in electrical contact with the movable contact 164 is an electrical wire 171, which wires 170 and 171 constitute an energizing circuit or input circuit and extend to an amplifier 173 whereby any current flowing in the circuit comprising the wires 170 and 171 may be amplified so as to produce an electrical current of sufficient magnitude to operate various apparatus.

The wire 170 is connected to a grid 174, and the wire 171 is connected to a filament 175. The filament 175 is connected through a portion of the wire 171 to a wire 176 which forms a part of the amplified or output circuit, and which circuit I term a "control circuit". The amplifier also includes a plate 177 which is connected to a wire 180 which also forms a part of the output or amplified circuit. The control circuit which includes the wires 176 and 180 if considered as separate from the oxygen concentration sensitive means is directly controlled by the apparatus 120 which is sensitive to and responsive to the oxygen concentration of the air or atmosphere in the cabin 12.

This apparatus 120, as shown in Fig. 5, is operated as follows. The adjustable contact 148 and the rheostat 156 are so positioned that the resistances in the sides 139 and 140 of the Wheatstone bridge are equal so that the current flow through the wires 158 and 160 and the parts connected therewith will be at zero value, or substantially zero value, when there is normal oxygen concentration in the atmosphere in which the flame 134 is burning. By normal oxygen concentration is meant any oxygen concentration in the atmosphere desired and which will comfortably support normal respiration. As pointed out heretofore, this need not be sea-level value. The current which flows from the battery 144, as indicated by the arrows, flows to the adjustable contact 148 where it then divides so that a part flows through the side 139 and another part flows through the side 140. The current meets at the point 155 and returns to the battery. If the resistances in the two sides 139 and 140 are the same, there will be no flow of current through the circuit including the wires 158 and 160.

When the oxygen concentration in the atmosphere decreases below normal, the volume of the flame 134 increases, which results in a change of temperature within the flame, which in turn produces a change in resistance in the filament 135. This produces an unbalanced condition of resistance in the two sides 139 and 140 and therefore causes a flow of current through the circuit including the wires 158 and 160. This flow of current in the circuit defined by the wires 158 and 160 is in direct proportion to the change in resistance in the resistance element or filament 135. The same flow (modified by the density compensator 161) is produced in the input or energizing circuit including the wires 170 and 171, and therefore whenever an unbalance of resistance is produced by the change of temperature within the flame 134 a current will flow through the input circuit and this current flow will be in direct proportion to the difference in resistance between the sides 139 and 140. The amplifying means 173 amplifies this current and produces a flow of current in the output circuit or control circuit including the wires 176 and 180 which is in direct proportion to the current which at any time may flow through the wires 170 and 171.

It will therefore be seen that when the oxygen concentration in the atmosphere within the cabin 12 is at normal there will be no flow of current in the control circuit, and that as the oxygen concentration decreases below normal the flow of current in the control circuit will increase, and the greater the deficiency, the greater the flow of current in this circuit.

The means for controlling the pressure control valve 102 is provided in the form of a solenoid coil 190 which is connected by wires 191 and 192 to the wires 176 and 180. It will therefore be seen that a magnetic field is set up in the coil 190 in proportion to the flow of current through the control circuit. Cooperating with the coil 190 is an armature 193 which is connected through a linkage 194 to a tension spring 195. This tension spring 195 tends to hold the armature 193 out of the field of the solenoid coil 190. As a current is applied to the control circuit the armature is pulled into the field and is pulled into the field a distance depending upon the flow of current in the control circuit. The linkage 194 is connected to an operating lever 196 of the valve 102. It will be seen, therefore, that when the armature 193 is pulled into the field of the solenoid winding 190, the valve 102 is operated. This valve 102 is normally open and is closed as the armature 193 is pulled into the field of the solenoid coil 190. It will therefore be seen that when the flow of current in the output circuit is quite high the vent valve 102 will be closed a relatively large amount. This in turn causes a greater pressure to be more rapidly built up in the oxygen flask 100, thus forcing a relatively large amount of liquid oxygen through the liquid oxygen supply pipe 103 to the oxygen vaporizer 104. It will be seen that with the arrangement diagrammatically illustrated the amount of oxygen delivered to the vaporizer 104 depends upon the amount of current flowing through the control circuit. Since this current increases with the increase in deficiency of oxygen, it will be seen that oxygen will be supplied to the system in amounts proportionate to the deficiency of oxygen in the circulated air.

The solenoid devices 31, 77, 84, 86, and 111 and the motor 89 are connected in a changeover circuit including wires 200, 201, and 202 which are connected to the battery or source of energy 56, and when this circuit is completed these devices will be energized. When this circuit is completed the solenoid devices will be operated so that the valves 77 and 31 are moved from an open position into a closed position, and the valves 84, 86, and 110 are moved from a closed position into an open position. The reverse operation occurs when this circuit is de-energized. Furthermore, when the circuit is energized the motor 89 is operated, and when the circuit is de-energized the motor 89 ceases its operation.

For the purpose of closing this changeover circuit I provide a manually operable switch 204 which connects the wires 200 and 202, which when closed completes the electrical circuit. I also provide pressure responsive means or an altitude responsive means 205 so that when the pressure drops to that corresponding to an elevation at which it is necessary to artificially supply oxygen the wires 200 and 202 will be connected together, thus closing the changeover circuit and operating the solenoids and blower motor. This means 205 I provide in the form of a stationary adjustable contact 206, which is connected by a wire 207 to the wire 202, and a movable contact 208 which pivots at 209, and which in turn is connected to an evacuated bellows 210 which elongates with a decrease in pressure and when a certain pressure is reached will swing the contact 208 into engagement with the contact 206. The contact 208 is in turn connected by a wire 211 to the wire 200 so that when the contacts 206 and 208 are in engagement the changeover circuit will be closed. These contacts 206 and 208 will remain in engagement so long as the pressure within the cabin is at or below a certain pressure. The arm supporting the contact 208 is made flexible so that an elongation of the bellows 210 after engagement of the contact has been made is rendered possible. The pressure responsive switch is rendered inoperative by opening a manually operable switch 212 connected in the wire 207.

The changeover circuit is also closed when there is a flow of current through the control circuit including the wires 176 and 180. The wire 202 is connected to a core 215 which serves as a stationary contact and the wire 200 is connected to a movable contact 216 positioned adjacent the core 215. This movable contact is held in open position by an adjustable spring 217. The wires 176 and 180 are connected to a coil 218 which surrounds the core 215 so that when there is a flow of current in the control circuit a magnetic field is generated and the movable contact 216 is pulled against the core 215, thus completing the changeover circuit. It will be seen, therefore, that whenever there is a flow of current, which corresponds to the minimum desired oxygen concentration in the cabin, in the output circuit, the contact 216 will be closed and the changeover circuit will be closed.

It will be noted that the three means for closing the changeover circuit are in parallel, and that the changeover circuit is closed when either one or more of these circuit closing switches are in closed position. The changeover circuit, the solenoids 31, 77, 84, 86, and 111, and the motor 89 constitute a changeover means which is operable by the three means referred to.

This concludes the description of the preferred form of my invention. The various sections and subcombinations incorporated in the preferred embodiment of my invention have been described. I will now describe in general the complete operation of the invention so that the features and advantages may be readily understood.

When the airplane is ready to be put into operation at ground level, which we may assume is at or near sea level, the changeover circuit is opened. This is due to the fact that there is no current flowing in the control circuit including the wires 176 and 180; that the atmospheric pressure is sufficiently high to keep separated the contacts 206 and 208 of the pressure or altitude responsive means 205, and that the manual switch 204 is not closed. When the parts are in this position the inlet and outlet valves 30 and 76 are opened, the valves 83 and 85 are closed, and the blower 88 out of operation. The vent valve 102 is also opened so that no pressure is created in the oxygen flask 100. Atmosphere at this time may be circulated through the cabin 12 and pilot's compartment 16, as previously explained. Ordinarily the system remains open until it is closed by the operation of the control circuit or the pressure or altitude responsive means 205. It should be understood, however, that if desired the air circulating system may be disconnected from the atmosphere even at sea-level altitude or any altitude by closing the manually operable switch 204. When this occurs the changeover circuit is energized and the valves 30 and 76 are closed, and the valves 83, 85, and 110 are opened, and the blower 88 set into operation. This causes the air to be sent through the recirculating system, and whenever the oxygen decreases below a desired point the oxygen sensitive device 120 will then function to partially or entirely close the vent valve 102, as previously pointed out, thus delivering oxygen into the circulating system. However, during usual operations of the apparatus the manually operable switch 204 is never closed and the system is kept open until such time that the surrounding atmosphere does not have a sufficient oxygen concentration.

Therefore, assuming a normal operation of the device, the air circulates from the outside of the airplane and through the cabin and pilot's compartment until the plane reaches an elevation at which the atmosphere does not have an adequate oxygen concentration. At this time either or both of two things may occur. In the first place, the pressure or altitude sensitive device 205 may operate to close the contacts 206 and 208 which closes the changeover circuit and changes the circulating system from the open system to the closed recirculating system. The other action which may occur is that as the oxygen becomes inadequate the oxygen indicator or oxygen sensitive device 120 will function to produce current in the control circuit. This energizes the winding 218 which sets up a magnetic field, and which moves the contact 216 into closed position.

With the changeover circuit closed, and the air in the cabin 12 and pilot's compartment 16 being recirculated, the oxygen concentration will be further decreased due to its being used by the occupants or due to reduction in pressure, and this will cause the oxygen concentration sensitive device 120 to function as pointed out. The current flow produced in the control circuit will operate the valve 102, in a manner previously pointed out, in accordance with the deficiency of oxygen in the circulated air. Oxygen will be supplied as previously explained in amounts required.

The pressure within the cabin is equal to the pressure outside the plane, as previously pointed out, this being accomplished either by normal leakage around windows or other structural parts and is particularly accomplished by use of the pressure equalizer 20 which is provided in the preferred form of my invention as a safeguard. This pressure equalizer 20 is so designed that even in sharp climbing or descent pressure will be maintained substantially equal inside and outside the airplane without any circulation of air therethrough. As previously stated, however, it is thought desirable to maintain a very slight excess of pressure within the airplane, and this is done by maintaining the inlet valve 30 in a slightly open position so that a small amount of air under a slight excess in pressure will be introduced into the system. Under these conditions, the air inlet 28 and inlet valve 30 serve as an "air introducing means". The excess in volume of atmosphere produced by this introduction of air may be relieved by normal leakage of the airplane by a small flow through the pressure equalizer 20 or by slightly opening the outlet valve 76.

During a normal operation of the plane it may be unnecessary to employ the manually operable switch 204 or the altitude responsive device, since adequate control is obtained through the oxygen indicator or oxygen sensitive device 120. However, under unusual flying conditions, such, for example, as where it is necessary to descend very rapidly from a high elevation, the change in pressure within the cabin 12 from a high elevation to a low elevation may so change the oxygen concentration that the oxygen concentration will become normal or above normal, with the result that there will be no flow of current in the control circuit, with the result that the coil 218 would be de-energized and this relay opened, thus inadvertently opening the changeover circuit at a relatively high elevation and at an elevation where the surrounding atmosphere does not contain adequate oxygen for normal or comfortable respiration. The use of the altitude sensitive device 205 prevents such inadvertent opening of the changeover circuit, since it will not open or separate the contacts 206 and 208 until the pressure within the cabin increases to a certain amount, thus assuring that the changeover circuit will not be de-energized and a changeover from the closed circuit to the open circuit will not occur until an elevation has been reached at which the surrounding atmosphere is suitable for breathing purposes. However, should there be such an inadvertent opening of the changeover circuit, as previously pointed out, the oxygen indicator would immediately close the circuit when the incoming air reduced the oxygen concentration in the cabin to its minimum limit.

In an emergency the manual switch 204 may be closed at any time. This immediately closes the air circulating system which is designed to function as a closed system at any elevation.

The air circulating system of my invention is not only designed to be positive and wholly dependable in operation, but also to be economical in its use of the oxygen artificially supplied.

In the first place, the system is designed to use the surrounding atmosphere for circulation through the ship whenever the oxygen concentration thereof is adequate. This in itself constitutes a valuable method of supplying atmosphere to the cabin of an aerial vehicle.

In the second place, my invention also comprehends a method of flying the aerial vehicle wherein oxygen is artificially supplied to the circulated air during ascent and horizontal flight as required, and in which during descent the pressure of the air in the cabin is gradually increased to maintain normal oxygen concentration, and thus eliminate the necessity for adding oxygen during descent. This latter mentioned step is accomplished by causing the aerial vehicle to descend at such a rate that the pressure within the cabin will increase so that the oxygen molecules per unit volume will be maintained above a minimum limit. This may be readily accomplished by placing in the pilot's compartment an oxygen concentration indicating gage 230 connected to the control circuit, which will readily enable the pilot to descend the aerial vehicle to maintain the proper gage reading. The changeover circuit will not open even though atmosphere in the cabin has a normal oxygen concentration because of the altitude responsive means 205. When the level is reached at which the surrounding atmosphere is suitable for use, the system is automatically converted from a closed system into an open system and the outside air will then be circulated through the cabin.

From the foregoing it will be seen that by use of my improved method, no oxygen need be added at any period during descent, and during ascent only after a certain altitude is reached.

In the form of my invention shown in Fig. 6 the cool air supply conduits 63 and the exhaust conduit 70 are combined into a single conduit 63A to which the pipes 64 connect and also to which the cool air supply pipe 67 is connected. The pipe 67 has a valve 67A operated by a solenoid 67B. The conduit 63A has registers 63B which are closed by register valve means 63C.

The return flow conduit 81 is connected to the single conduit 63A.

The outlet opening 75, the outlet valve 76, and solenoid 77 are eliminated from this form of the invention and in place thereof there is an outlet opening 75A, which communicates directly between the interior and exterior of the airplane and is not associated with any conduit, an outlet valve 76A, and a solenoid 77A for operating the valve 76A.

All other parts are of the same construction and operation as in Figs. 1 to 5 and the indicating numerals are the same.

In the operation of this form of my invention when air is circulated from the exterior through the airplane and outward through the outlet opening 75A, the valve 67A is open so that cool air is available. When the system is closed the valves 76A and 67A are closed and the valves 83 and 85 and the registers 63B are opened so as to employ the single conduit 63A as a part of the recirculation system.

I claim as my invention:

1. In an aerial vehicle, adapted to be propelled through the air at various elevations, an air circulating and conditioning system which includes: a cabin provided by the ship of said aerial vehicle; an air supply means for introducing air into said cabin, and being connected to the exterior of said aerial vehicle; an air exhaust means for withdrawing air from said cabin, and being connected to the exterior of said aerial vehicle; air recirculating means whereby air may be withdrawn from said cabin and reintroduced thereinto; closing means for closing said air inlet means and said air exhaust means from the exterior and causing air to recirculate through said air recirculating means; a liquid oxygen flask; an oxygen vaporizer; a liquid oxygen supply pipe for delivering liquid oxygen to said oxygen vaporizer; an oxygen pipe extending from said vaporizer for supplying oxygen to said circulated air; a vent for said oxygen flask; a vent valve for closing said vent to develop a pressure in said oxygen flask for forcing liquid oxygen from said oxygen flask into said liquid oxygen supply pipe; and oxygen concentration sensitive means for operating said vent valve.

2. In an aerial vehicle, adapted to be propelled through the air at various elevations, an air circulating and conditioning system which includes: a cabin provided by the ship of said aerial vehicle; an air supply means for introducing air into said cabin, and being connected to the exterior of said aerial vehicle; an air exhaust means for withdrawing air from said cabin, and being connected to the exterior of said aerial vehicle; air recirculating means whereby air may be withdrawn from said cabin and reintroduced thereinto; closing means for closing said air inlet means and said air exhaust means from the exterior and causing air to recirculate through said air recirculating means; a liquid oxygen flask; an oxygen vaporizer; a liquid oxygen supply pipe for delivering liquid oxygen to said oxygen vaporizer; an oxygen pipe extending from said vaporizer for supplying oxygen to said circulated air; a vent for said oxygen flask; a vent valve for closing said vent to develop a pressure in said oxygen flask for forcing liquid oxygen from said oxygen flask into said liquid oxygen supply pipe; and oxygen concentration sensitive means for operating said closing means and for operating said vent valve.

3. In an aerial vehicle, adapted to be propelled through the air at various elevations, an air circulating and conditioning system which includes: a cabin provided by the ship of said aerial vehicle; an air supply means for introducing air into said cabin; an air exhaust means for withdrawing air from said cabin; air recirculating means whereby air may be withdrawn from said cabin and reintroduced thereinto; a liquid oxygen flask; an oxygen vaporizer; a liquid oxygen supply pipe for delivering liquid oxygen to said oxygen vaporizer; an oxygen pipe extending from said vaporizer for supplying oxygen to said circulated air; pressure applying means for forcing liquid oxygen from said oxygen flask into said liquid oxygen supply pipe; and oxygen concentration sensitive means for operating said pressure applying means.

4. In an aerial vehicle, adapted to be propelled through the air at various elevations, an air circulating and conditioning system which includes: a cabin provided by the ship of said aerial vehicle; an air supply means for introducing air into said cabin; an air exhaust means for withdrawing air from said cabin; air recirculating means whereby air may be withdrawn from said cabin and reintroduced thereinto; a liquid oxygen flask; an oxygen vaporizer; a liquid oxygen supply pipe for delivering liquid oxygen to said oxygen vaporizer; an oxygen pipe extending from said vaporizer for supplying oxygen to said circulated air; a vent for said oxygen flask; a vent valve for closing said vent to develop a pressure in said oxygen flask for forcing liquid oxygen from said oxygen flask into said liquid oxygen supply pipe; and oxygen concentration sensitive means for operating said vent valve.

5. In an aerial vehicle, adapted to be propelled through the air at various elevations, an air circulating and conditioning system which includes: a cabin provided by the ship of said aerial vehicle; an air supply means for introducing air into said cabin; an air exhaust means for withdrawing air from said cabin; air recirculating means whereby air may be withdrawn from said cabin and reintroduced thereinto; a liquid oxygen flask; an oxygen vaporizer; a liquid oxygen supply pipe for delivering liquid oxygen to said oxygen vaporizer; an oxygen pipe extending from said vaporizer for supplying oxygen to said circulated air; a vent for said oxygen flask; a vent valve for closing said vent to develop a pressure in said oxygen flask for forcing liquid oxygen from said oxygen flask into said liquid oxygen supply pipe; and oxygen concentration sensitive means for operating said air recirculating means and for operating said vent valve.

6. A method of supplying air having sufficient oxygen concentration to satisfy normal or comfortable respiration, to an aerial vehicle adapted to be propelled at different elevations through the air and including a ship having a cabin for occupants, the method including the steps of: taking air from the exterior of said ship, delivering it into said cabin, and discharging same back to the exterior during such times that such atmosphere has adequate oxygen concentration; recirculating air within said ship when the oxygen concentration of the exterior air is inadequate; adding to the recirculated air sufficient oxygen to maintain adequate the oxygen concentration thereof during the time said aerial vehicle is ascending; discontinuing the addition of oxygen to the air in the cabin during descent of the aerial vehicle; and causing said aerial vehicle to descend at such a rate that the oxygen concentration in said cabin will be maintained adequate by introduction of air from the exterior without adding of oxygen thereto.

7. A method of supplying air having sufficient oxygen concentration to satisfy normal or comfortable respiration, to an aerial vehicle adapted to be propelled at different elevations through the air and including a ship having a cabin for occupants, the method including the steps of: taking air from the exterior of said ship, delivering it into said cabin, and discharging same back to the exterior during such times that such atmosphere has adequate oxygen concentration; recirculating air within said ship when the oxygen concentration of the exterior air is inadequate; adding to the recirculated air sufficient oxygen to maintain adequate the oxygen concentration thereof during the time said aerial vehicle is ascending; discontinuing the addition of oxygen to the air in the cabin during descent of the aerial vehicle; causing said aerial vehicle to descend at such a rate that the oxygen concentration in said cabin will be maintained adequate by introduction of air from the exterior without adding of oxygen thereto; and substantially balancing the internal and external air pressures so that there will be essentially no bursting or collapsing pressures applied to the cabin.

8. A method of supplying air having sufficient oxygen concentration to satisfy normal or comfortable respiration, to an aerial vehicle adapted to be propelled at different elevations through the air and including a ship having a cabin for occupants, the method including the steps of: taking air from the exterior of said ship, delivering it into said cabin, and discharging same back to the exterior during such times that such atmosphere has adequate oxygen concentration; recirculating air within said ship when the oxygen concentration of the exterior air is inadequate; adding to the recirculated air sufficient oxygen to maintain adequate the oxygen concentration thereof during the time said aerial vehicle is ascending; discontinuing the addition of oxygen to the air in the cabin during descent of the aerial vehicle; causing said aerial vehicle to descend at such a rate that the oxygen concentration in said cabin will be maintained adequate by introduction of air from the exterior without adding of oxygen thereto; and introducing a small amount of air into said cabin from the exterior of said ship during said recirculation of air within said ship.

9. A method of supplying air having sufficient oxygen concentration to satisfy normal or comfortable respiration, to an aerial vehicle adapted to be propelled at different elevations through the air and including a ship having a cabin for occupants, the method including the steps of: taking air from the exterior of said ship, delivering it into said cabin, and discharging same back to the exterior during such times that such atmosphere has adequate oxygen concentration; recirculating air within said ship when the pressure of the air reaches a predetermined lower limit; adding to the recirculated air sufficient oxygen to maintain adequate the oxygen concentration thereof during the time said aerial vehicle is ascending; discontinuing the addition of oxygen to the air in the cabin during descent of the aerial vehicle; and causing said aerial vehicle to descend at such a rate that the oxygen concentration in said cabin will be maintained adequate by introduction of air from the exterior without adding of oxygen thereto.

10. A method of supplying air having sufficient oxygen concentration to satisfy normal or comfortable respiration, to an aerial vehicle adapted to be propelled at different elevations through the air and including a ship having a cabin for occupants, the method including the steps of: taking air from the exterior of said ship, delivering it into said cabin, and discharging same back to the exterior during such times that such atmosphere has adequate oxygen concentration; completely discontinuing such circulation with the exterior of said ship and recirculating air within said ship when the pressure of the air reaches a predetermined lower limit; adding to the recirculated air sufficient oxygen to maintain adequate the oxygen concentration thereof during the time said aerial vehicle is ascending; discontinuing the addition of oxygen to the air in the cabin during descent of the aerial vehicle; and causing said aerial vehicle to descend at such a rate that the oxygen concentration in said cabin will be maintained adequate by introduction of air from the exterior without adding of oxygen thereto.

11. A method of supplying air having sufficient oxygen concentration to satisfy normal or comfortable respiration, to an aerial vehicle adapted to be propelled at different elevations through the air and including a ship having a cabin for occupants, the method including the steps of: recirculating air within said ship so that the same is supplied to said cabin; adding to the recirculated air sufficient oxygen to maintain adequate the oxygen concentration thereof during the time said aerial vehicle is ascending; discontinuing the addition of oxygen to the air in the cabin during descent of the aerial vehicle; and causing said aerial vehicle to descend at such a rate that the oxygen concentration in said cabin will be maintained adequate by introduction of air from the exterior without adding of oxygen thereto.

12. A method of supplying air having sufficient oxygen concentration to satisfy normal or comfortable respiration, to an aerial vehicle adapted to be propelled at different elevations through the air and including a ship having a cabin for occupants, the method including the steps of: recirculating air within said ship so that the same is supplied to said cabin; adding to the recirculated air sufficient oxygen to maintain adequate the oxygen concentration thereof during the time said aerial vehicle is ascending; discontinuing the addition of oxygen to the air in the cabin during descent of the aerial vehicle; causing said aerial vehicle to descend at such a rate that the oxygen concentration in said cabin will be maintained adequate by introduction of air from the exterior without adding of oxygen thereto; and substantially balancing the internal and external air pressures so that there will be essentially no bursting or collapsing pressures applied to the cabin.

13. A method of supplying air having sufficient oxygen concentration to satisfy normal or comfortable respiration, to an aerial vehicle adapted to be propelled at different elevations through the air and including a ship having a cabin for occupants, the method including the steps of: recirculating air within said ship so that the same is supplied to said cabin; adding to the recirculated air sufficient oxygen to maintain adequate the oxygen concentration thereof during the time said aerial vehicle is ascending; discontinuing the addition of oxygen to the air in the cabin during descent of the aerial vehicle; causing said aerial vehicle to descend at such a rate that the oxygen concentration in said cabin will be maintained adequate by introduction of air from the exterior without adding of oxygen thereto; and introducing a small amount of air into said cabin from the exterior of said ship during said recirculation of air within said ship.

OTTO HAROLD OTTERSON.